UNITED STATES PATENT OFFICE.

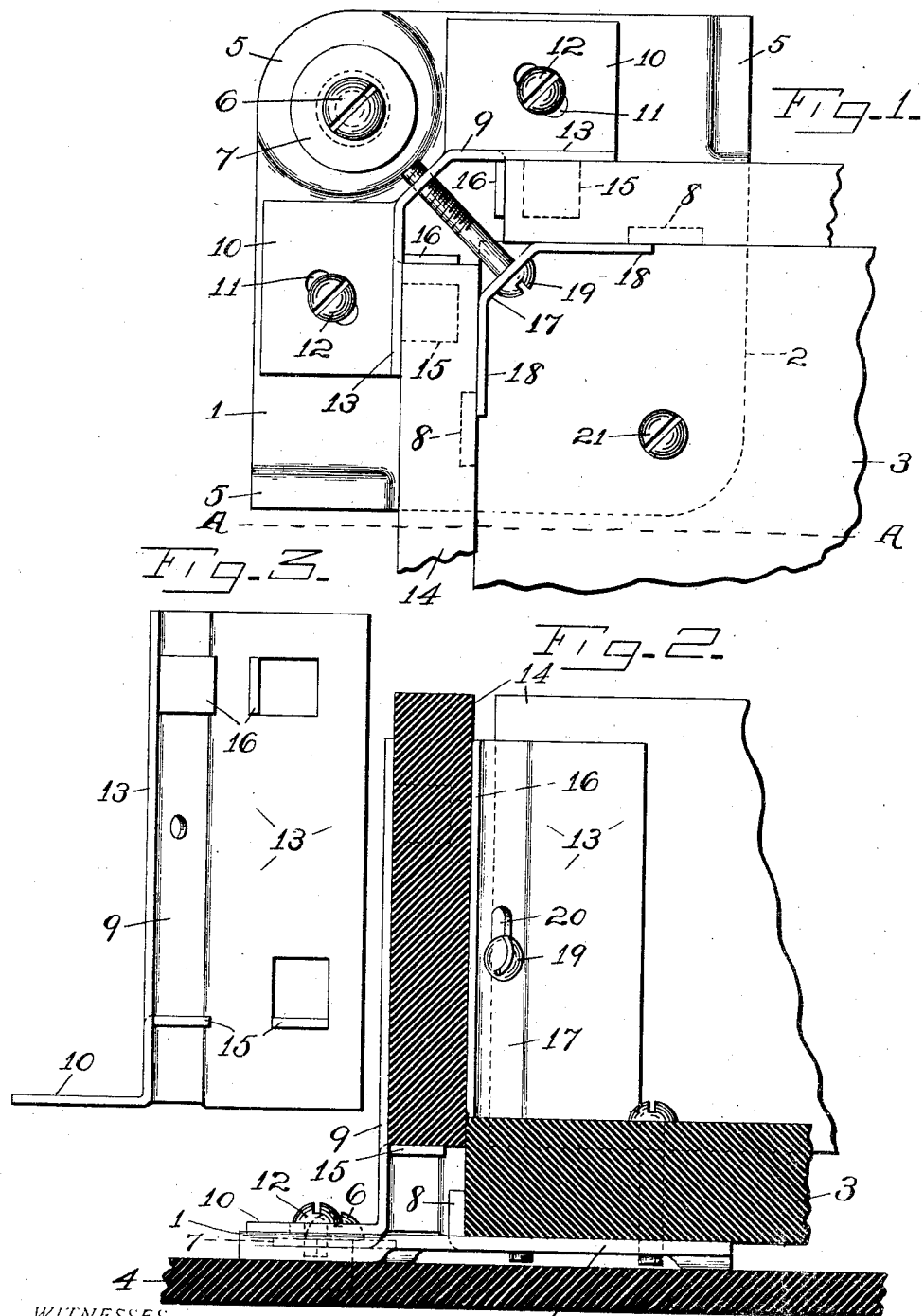

EDWIN A. OLLEY, OF SYRACUSE, NEW YORK, ASSIGNOR TO CROUSE-HINDS COMPANY, OF SYRACUSE, NEW YORK, A CORPORATION OF NEW YORK.

PANEL-BOARD SUPPORT.

1,265,364.

Specification of Letters Patent.

Patented May 7, 1918.

Application filed January 9, 1914. Serial No. 811,191.

*To all whom it may concern:*

Be it known that I, EDWIN A. OLLEY, a citizen of the United States, and a resident of Syracuse, in the county of Onondaga and State of New York, have invented a certain new and useful Panel-Board Support, of which the following is a specification.

This invention has for its object a support for panel boards, which is particularly simple in construction and highly efficient in use; and it consists in the novel features of construction hereinafter set forth and claimed.

In describing this invention, reference is had to the accompanying drawings, in which like characters designate corresponding parts in all the views.

Figure 1 is a plan view of this support, the contiguous portions of the base of the panel board and the lining strips being also shown.

Fig. 2 is a sectional view on line A—A, Fig. 1.

Fig. 3 is a detail view of the bracket of the support.

This support for panel boards is usually termed a corner iron and it comprises, generally, a base for securement to a wall or other support, a bracket rising from and detachably mounted on the base and arranged to lap the outer faces of two lining strips, and having means for supporting said strips independently of the base, a clamping member coacting with the inner faces of the lining strips, and means connecting the clamping member and the bracket.

1 is the base, which is formed of sheet metal plate, rectangular in general form, this base having portions 2 thereof adapted to extend under the base 3 of the panel board and upon which the base 3 rests. The base 1 of the support is shown as having depressed portions preferably located at three of its corners, which engage the wall or other support 4 and constitute feet 5 which support the base 1 with the greater portion offset from the wall 4.

The base 1 is secured to the wall 4 by means of a screw 6 located in the outer corner thereof and extending through the base and into the wall 4. The head of the screw 6 rests upon a washer 7, the washer 7 being large enough to cover a hole of much larger diameter than the shank of the screw, which hole permits a certain amount of shifting or adjusting movement of the base 1. The base 1 is also formed with upturned lugs 8 struck therefrom and arranged to engage the side edges of the base 3 of the panel board.

9 is the bracket rising from the base, the bracket 9 being struck from a sheet metal blank and having flanges 10 which rest on the base 1 and which are formed with slots 11 for receiving clamping screws 12 threading into the base 1, the slots permitting the adjustment of the bracket to different thicknesses of lining strips. The bracket 9 is formed with portions, as flanges or wings 13, lapping the outer faces of the lining strips 14, and these wings are formed with lugs 15 and 16 struck therefrom and bent inwardly in position to engage, respectively, the end edges and the lower edges of the lining strips 14, the lining strips resting on the lugs 15 and abutting against the lugs 16. Hence, the brackets support the lining strips independently of the base and panel board base.

17 is the clamping member pressed from sheet metal and having flanges or wings 18 which engage the inner faces of the lining strips 14 and press the same toward the wings or flanges 13 of the bracket, the clamping member 17 being connected to the bracket 9 by means of a screw 19 extending through a slot 20 in the intermediate portion of the clamping member and between the ends of the lining strips 14 and threading into the intermediate portions of the bracket 9. The slot 20 permits the clamping member to be adjusted to different thicknesses of panel board bases, it being understood that the lower edge of the clamping member engages the panel board base.

21 is the screw extending through the base 3 of the panel board into the portion of the base 1 of the corner iron offset from the wall. Although this device is here shown as arranged at the corner of a panel board and uniting lining strips which meet at a corner, it may be arranged to unite sections of lining strips which meet between corners and to support the base of a panel board between corners.

In operation, the base 1 is secured to the support or wall 4 and the bracket 9 adjusted to the proper, or approximately the proper, position to engage the lining strips 14, and the screws 19 and 20 turned to their operative position.

This corner iron is particularly advantageous in that it is so constructed that the principal parts can be formed of sheet metal, and further in that the lining strips are supported solely by the corner irons and can be readily removed when desired by loosening the screw 19 until there is sufficient looseness to permit the lining strips to be first tilted inwardly and then lifted away from the lug 15, this operation being done without removing the trim usually covering the upper edges of the lining strips.

What I claim is:—

1. A support for panel boards including a base, a bracket rising from the base and having portions for lapping the outer side faces of two lining strips, and also lugs arranged to engage the end edges of the lining strips, and a clamping member coacting with the bracket and engaging the inner faces of the lining strips, substantially as and for the purpose described.

2. A support for panel boards comprising a base, a bracket rising from the base and having portions lapping the outer faces of two lining strips, the bracket also having lugs engaging the lower edges of the lining strips to support the lining strips independently of the panel board, and a clamping member coacting with the inner faces of the lining strips, substantially as and for the purpose specified.

3. A support for panel boards comprising a base, a bracket rising from the base and having portions lapping the outer faces of two strips, and formed with inturned lugs upon which the lining strips rest, said portions also having inturned lugs against which the end edges of the lining strips abut, and a clamping member for engaging the inner faces of the lining strips, substantially as and for the purpose set forth.

4. A support for panel boards comprising a base having a portion thereof arranged to extend under the base of the panel board and having upwardly extending lugs for engaging the edges of the panel board, substantially as and for the purpose described.

5. A support for panel boards comprising a base having a portion thereof arranged to extend under the base of the panel board, and also having upwardly extending lugs for engaging the edges of the panel board, a bracket rising from the base of the support and having portions arranged to lap the outer faces of two lining strips, the bracket having lugs on the inner side thereof arranged to engage the lower edges and the end edges of said lining strips, a clamping member arranged to engage the inner faces of the lining strips, and means connecting the clamping member to the bracket, substantially as and for the purpose specified.

6. A support for panel boards comprising a base, a bracket rising from the base and having flanges arranged to lap the outer faces of the lining strips, said flanges being formed with lugs struck therefrom and bent inwardly in position to engage the lower edges and the end edges of two lining strips, substantially as and for the purpose set forth.

7. A sheet metal support for panel boards comprising a base plate for extending under the base of the panel board, a bracket rising from the base and having flanges for lapping the outer sides of two lining strips, said flanges having lugs struck therefrom and bent inwardly in position to engage the lower edges and the end edges of said lining strips, and the base being adapted to extend under the base of the panel board and having depressed portions forming feet which hold the greater portion of the base offset from a supporting wall, the base also having lugs struck therefrom and bent upwardly in position to engage edges of the base of the panel board, a clamping member arranged to engage the inner faces of the lining strips, and means connecting the clamping member and the bracket, substantially as and for the purpose described.

8. A support for panel boards comprising a base, and a bracket detachably mounted on the base and having means associated therewith for engaging and supporting the lining strips of the panel board independently of the base, substantially as and for the purpose specified.

9. A support for panel boards comprising a base having means for attachment to, and for supporting the base of a panel board, and a bracket detachably mounted on the base of the support and having means for supporting the lining strips of the panel board independently of the base of the support and the base of the panel board, substantially as and for the purpose set forth.

In testimony whereof, I have hereunto signed my name in the presence of two attesting witnesses, at Syracuse, in the county of Onondaga, in the State of New York, this 6th day of January, 1914.

EDWIN A. OLLEY.

Witnesses:
C. C. Schoeneck,
Wm. Cornell Blanding.

Copies of this patent may be obtained for five cents each, by addressing the "Commissioner of Patents, Washington, D. C."